United States Patent
Windh et al.

(10) Patent No.: US 11,815,935 B2
(45) Date of Patent: Nov. 14, 2023

(54) PROGRAMMING A COARSE GRAINED RECONFIGURABLE ARRAY THROUGH DESCRIPTION OF DATA FLOW GRAPHS

(71) Applicant: Micron Technology, Inc., Boise, ID (US)

(72) Inventors: Skyler Arron Windh, McKinney, TX (US); Allan Kennedy Porterfield, Durham, NC (US); Douglas John Vanesko, Dallas, TX (US); Randall Paul Meyer, Allen, TX (US); Patrick Alan Estep, Rowlett, TX (US); Bashar Romanous, Allen, TX (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/705,099

(22) Filed: Mar. 25, 2022

(65) Prior Publication Data
US 2023/0315415 A1 Oct. 5, 2023

(51) Int. Cl.
*G06F 8/41* (2018.01)
(52) U.S. Cl.
CPC .............. *G06F 8/453* (2013.01); *G06F 8/433* (2013.01); *G06F 8/451* (2013.01); *G06F 8/457* (2013.01); *G06F 8/458* (2013.01)
(58) Field of Classification Search
None
See application file for complete search history.

(56) References Cited

U.S. PATENT DOCUMENTS

| | | | |
|---|---|---|---|
| 6,212,566 B1 * | 4/2001 | Vanhoof | G06F 8/10 709/200 |
| 10,698,859 B2 | 6/2020 | Burger et al. | |
| 10,776,115 B2 * | 9/2020 | Burger | G06F 9/30047 |
| 11,126,433 B2 * | 9/2021 | Burger | G06F 9/3004 |
| 11,170,307 B1 | 11/2021 | Ross et al. | |
| 11,507,493 B1 * | 11/2022 | Windh | G06F 11/3656 |
| 2004/0088685 A1 | 5/2004 | Poznanovic et al. | |

(Continued)

FOREIGN PATENT DOCUMENTS

WO  WO-2023020055 A1 *  2/2023

OTHER PUBLICATIONS

Artur Podobas, et al. "A Survey on Coarse-Grained Reconfigurable Architectures From a Performance Perspective" IEEE Access, 2020.

(Continued)

*Primary Examiner* — Philip Wang
*Assistant Examiner* — Rongfa P Wang
(74) *Attorney, Agent, or Firm* — Greenberg Traurig (57) ABSTRACT

An assembly language program for a coarse grained reconfiguration array (CGRA), having dispatch interface information indicating operations to be performed via a dispatch interface of the CGRA to receive an input, memory interface information indicating operations to be performed via one or more memory interfaces of the CGRA, tile memory information indicating memory variables referring to memory locations to be implemented in tile memories of the CGRA, a flow description specifying one or more synchronous data flows, through the memory locations referenced via the memory variables in the tile memory information, to produce a result from the input using the CGRA.

20 Claims, 6 Drawing Sheets

(56) References Cited

U.S. PATENT DOCUMENTS

| | | | |
|---|---|---|---|
| 2008/0244152 A1 | 10/2008 | Chai et al. | |
| 2010/0122105 A1 | 5/2010 | Arslan et al. | |
| 2011/0238948 A1 | 9/2011 | Vorbach et al. | |
| 2013/0007331 A1 | 1/2013 | Pechanek et al. | |
| 2015/0127935 A1* | 5/2015 | Choi | G06F 9/30 713/100 |
| 2015/0268963 A1 | 9/2015 | Etsion et al. | |
| 2016/0019154 A1* | 1/2016 | Gooding | G06F 9/3816 711/137 |
| 2019/0057060 A1 | 2/2019 | Nicol | |
| 2019/0227777 A1 | 7/2019 | Chofleming, Jr. et al. | |
| 2019/0229996 A1* | 7/2019 | ChoFleming, Jr. | H04L 43/16 |
| 2019/0303147 A1* | 10/2019 | Brewer | G06F 9/45558 |
| 2019/0303154 A1 | 10/2019 | Brewer | |
| 2019/0303346 A1* | 10/2019 | Brewer | G06F 9/325 |
| 2019/0317771 A1 | 10/2019 | Vembu et al. | |
| 2019/0347542 A1 | 11/2019 | Chen et al. | |
| 2020/0133672 A1* | 4/2020 | Balasubramanian | G06F 12/0862 |
| 2021/0089349 A1 | 3/2021 | Etsion et al. | |
| 2021/0141571 A1 | 5/2021 | Lew et al. | |
| 2021/0312320 A1 | 10/2021 | Shah et al. | |
| 2022/0413742 A1* | 12/2022 | Vanesko | G06F 3/0679 |

OTHER PUBLICATIONS

John Schulman, et al. "Proximal Policy Optimization Algorithms", arXiv: 1707.06347v2 [cs.LG] Aug. 28, 2017.

Mehdi Hassanpour, et al. "A Survey of Near-Data Processing Architectures for Neural Networks", arXiv:2112.12630v1 [cs.AR] Dec. 23, 2021.

Mirhoseini, Azalia, et al. "Chip placement with deep reinforcement learning." arXiv preprint arXiv:2004.10746(2020).

Zhou, Yanqi, et al. "Gdp: Generalized device placement for dataflow graphs." arXiv preprint arXiv:1910.01578 (2019).

Chang, Andre Xian Ming, et al., "Reinforcement learning Approach for Mapping Applications to Dataflow-Based Coarse-Grained Reconfigurable Array." arXiv:2205.13675v1, May 2022.

International Search Report and Written Opinion, PCT/US2023/015808, dated Jun. 28, 2023.

International Search Report and Written Opinion, PCT/US2023/014859, dated Jun. 27, 2023.

Liu, Dajiang, et al., "Data-Flow Graph Mapping Optimization for CGRA With Deep Reinforcement Learning." IEEE Transactions on Computer-Aided Design of Integrated Circuits and Systems, IEEE, Oct. 2018.

Mirmahaleh, Seyedeh Yasaman Hosseini, et al., "Data Scheduling and Placement in Deep Learning Accelerator." Cluster Computing, Jul. 10, 2021.

Oliveira, Westerley C., et al., "Heterogeneous Reconfigurable Architectures for Machine Learning Dataflows." Concurrency and Computation Practice and Experience, John Wiley & Sons, Ltd., Feb. 25, 2022.

Podobas, Artur, et al., "A Survey on Coarse-Grained Reconfigurable Architectures from a Performance Perspective." IEEE Access, Jul. 27, 2020.

International Search Report and Written Opinion, PCT/US2023/014858, dated Jun. 27, 2023.

* cited by examiner

PROGRAMMING A COARSE GRAINED RECONFIGURABLE ARRAY THROUGH DESCRIPTION OF DATA FLOW GRAPHS

TECHNICAL FIELD

At least some embodiments disclosed herein relate to instruction programming for a computing device having circuit tiles for parallel execution in general and more particularly, but not limited to, assembly language programs for execution in Coarse Grained Reconfigurable Arrays.

BACKGROUND

Traditionally, assembly language programming is based on specifying operations to be performed on data stored in registers. A typical opcode is specified to identify an operation to be performed on data stored in one or more registers identified for the opcode; and the result of the operation is to be stored in a register identified for the opcode.

BRIEF DESCRIPTION OF THE DRAWINGS

The embodiments are illustrated by way of example and not limitation in the figures of the accompanying drawings in which like references indicate similar elements.

DETAILED DESCRIPTION

At least some embodiments disclosed herein provide techniques of assembly language programs specifying data flows to be implemented in a coarse grained reconfigurable array having memory interfaces to memories in multiple parallel circuit units.

Compute Near Memory (CNM) architecture can be used to leverage the dramatic opportunities provided by high performance communication protocols, such as the Compute Express Link (CXL) protocol. Such Compute Near Memory (CNM) architecture can incorporate heterogenous compute elements in a memory/storage subsystem to accelerate various computing tasks near data. An example of such compute elements is a Streaming Engine (SE) implemented via a Coarse Grained Reconfigurable Array (CGRA) having interconnected computing tiles. The tiles are interconnected with both a Synchronous Fabric (SF) and an Asynchronous Fabric (AF). The synchronous Fabric (SF) can be configured to connect each tile with neighboring tiles that are one or two clock cycles away. The Synchronous Fabric (SF) interconnects elements within each tile, such as tile memory, multiplexers, and Single Instruction Multiple Data (SIMD) units, etc. Tiles can be pipelined through Synchronous fabric (SF) to form a synchronous data flow (SDF) through the Single Instruction Multiple Data (SIMD) units for operations such as multiply/shift, add/logical operations, etc. Each tile can have a pipelined time-multiplexed processing unit such that a new instruction can start on each tile at every clock cycle. The asynchronous fabric (AF) connects a tile with other tiles, a dispatch interface (DI), and memory interfaces (MIs). The asynchronous fabric (AF) bridges synchronous data flows (SDF) through asynchronous operations, which include initiation of synchronous data flow, asynchronous data transfer from one synchronous data flow to another, system memory accesses, and branching and looping constructs. Each tile can have a delay register to hold its output for outputting with timing alignment with execution of an instruction that uses the output. Together, the Synchronous Fabric (SF) and Asynchronous Fabric (AF) allow the tiles to efficiently execute high-level programming language constructs. Simulation results of hand-crafted streaming engine (SE) kernels have shown orders-of-magnitude better performance per watt on data-intensive applications than existing computing platforms.

However, it is challenging to apply traditional compilation tools to program operations of a new architecture, such as Streaming Engine (SE) implemented using a Coarse Grained Reconfigurable Array (CGRA). In a dataflow based Coarse Grained Reconfigurable Array (CGRA), a program works by flowing data from one tile to another in a synchronous fashion. This requires instructions to be programmed at an exact cycle on the correct tile to avoid corruption of the synchronous flow of operations. Instead of morphing a dataflow to pretend it is a sequence of register transfers as in traditional assembly, at least some embodiments discussed in the present disclosure use a new assembly language with a corresponding parser that enables describing a program as a group of graphs that represent the data flows.

Configuring a Streaming Engine (SE) requires finding a synchronous schedule of instructions such that a flow can start for a data element and have every subsequent instruction line-up on a valid tile on the correct cycle. The assembly language of at least some embodiments discussed in the present disclosure is advantageous in the determination of such a synchronous schedule. It can be used to describe some of the configuration details of the hardware as well as the data flow of the computation.

In one embodiment, the assembly language is configured to describe the details of a program for a Streaming Engine (SE). For example, a dispatch interface (DI) block of the program can be configured to specify information about the dispatch interface of the Streaming Engine (SE); a memory interface (MI) block can be configured to specify information about memory operations implemented via memory interfaces of the Streaming Engine (SE); a tile memory (TM) block can be configured to specify information about memory variables to be mapped to tile memories of the Streaming Engine (SE); and a flows block can be configured to specify a group of graphs representative of the synchronous data flows.

Optionally, a user describes the computation to be performed by a Streaming Engine (SE) in terms of configuration details specified using the dispatch interface (DI) block, the memory interface (MI) block, and tile memory (TM) block, and the program details via the flows block. Such an assembly language program can be parsed, mapped, and lowered by a software tool into a program execution configuration of the Streaming Engine in running the assembly language program.

Optionally, a compiler can be used to automate the conversion of a computer program written in a high-level programming language to the assembly language program according to the present disclosure.

The disclosed techniques of assembly language programs have various advantages. For example, representing configuration and data flow allows the assembly to reflect the device state. For example, programming data flows allows a programmer to work in terms of how data is moving between operations instead of how to schedule the hardware details between tiles. For example, breaking code into separate synchronous flows allows the programmer to explicitly define the asynchronous messaging that happens between synchronous elements. For example, programming the device at the abstract representation of assembly language is much faster than working at the low-level details of specifying operations of the multiplexers and tile connections. For example, a parser can provide friendlier error messaging for typos and inconsistent logic instead of debugging why the device simulation didn't terminate or provided incorrect answers. For example, defining an assembly language opens future possibilities of leveraging mainstream compiler tools to compile high level code down to this more abstract description of the device. For example, since programs are lists of instructions, high and low-level knobs can be provided to the programmer through instruction representation. For example, a low-level type of instruction allows the programmer to specify individual fields/opcodes that end up in the instruction; or, a high-level format in terms of operations instead of fields can be used.

Figure 1:
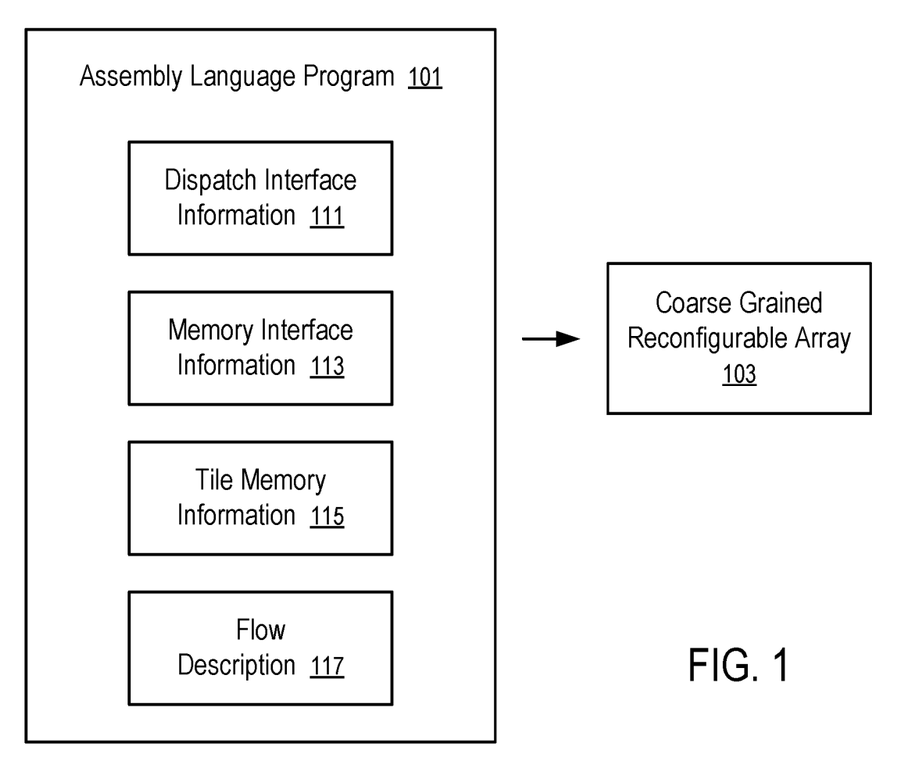
FIG. 1 illustrates the structure of an assembly language program for execution in a coarse grained reconfigurable array according to one embodiment.

FIG. 1 illustrates the structure of an assembly language program for execution in a coarse grained reconfigurable array according to one embodiment.

In FIG. 1, an assembly language program 101 is configured with dispatch interface information 111, memory interface information 113, tile memory information 115, and a flow description 117.

The dispatch interface information 111 identifies memory variables to accept arguments to be passed as input to the assembly language program 101, and data properties of the arguments. The dispatch interface information 111 can further specify the data proprieties of return value of the assembly language program 101. The dispatch interface information 111 can be used to configure the dispatch interface of a coarse grained reconfigurable array (CGRA) 103 used to implement the assembly language program 101. To execute the assembly language program 101, the memory variables identified in the dispatch interface information 111 are mapped to the tile memories in the coarse grained reconfigurable array (CGRA) 103. Thus, the dispatch interface information 111 specifies the operations of the dispatch interface to store input data to memory locations represented by the memory variables.

The memory interface information 113 identifies memory access operations that are performed in the flow description 117 to access tile memories in the coarse grained reconfigurable array (CGRA) 103. The memory access operations can include operations to store data into memory variables that are used in the flow description 117, and operations to read data from memory variables that are used in the flow description 117. To execute the assembly language program 101, the memory variables identified in the memory interface information are mapped to the tile memories in the coarse grained reconfigurable array (CGRA) 103.

The tile memory information 115 identifies memory variables used in the flow description 117 and access properties of the memory variables. Such memory variables can include the memory variables identified in the dispatch interface information 111 to store arguments or inputs to the assembly language program 101, the memory variables identified in the memory interface information 113, and other memory variables that can be used in synchronous operations of data flows in the flow description 117.

The flow description 117 specifies one or more data flow graphs. Each data flow graph identifies a synchronous flow of data through memory variables mapped to tile memories and synchronous values mapped to connections between tiles; and each data flow graph further identifies the computations (e.g., add, multiplication, bitwise shift, etc.) performed on those values on the tile data path. For example, some memory variables can be identified in dispatch interface information 111, memory interface information 113, tile memory information 115 for synchronous use (e.g., FIFO) or asynchronous use (e.g., dispatch/memory interface) of tile memories and thus for mapping to tile memories in implementations; additional variables can be used in the flow description 117 that may or may not be mapped to tile memories in implementations. For example, a synchronous value used through a FIFO in the flow description 117 is mapped to a tile memory; some variables in the flow description 117 can be mapped to tile memories using a FIFO to satisfy timing requirements in scheduling instructions for execution on tiles of the coarse grained reconfigurable array (CGRA) 103; and it is not necessary to map some variables in the flow description 117 to tile memories. The data flow graph can include identification of memory access operations specified in the memory interface information 113. The memory access operations specified in the memory interface information 113 are implemented via communications over asynchronous fabric (AF) in the coarse grained reconfigurable array (CGRA) 103. In one embodiment, the flow description 117 can have multiple segments, each specifying one data flow. Each data flow can optionally include the identification of a set of asynchronous variables specified in the dispatch interface information 111, the memory interface information 113, and the tile memory information 115. The instructions of a data flow can start execution upon receiving messages indicating the readiness of the data identified by the set of asynchronous variables. Each data flow can be programmed to send an asynchronous message to another data flow (e.g., to start execution of a loop, to continue a flow, to send a data value, etc.). Each data flow may stop with one or more instructions outputting results into asynchronous variables specified in the dispatch interface information 111, the memory interface information 113, and the tile memory information 115. New identifications of data/variables can be used in each data flow to represent data generated within the data flow. Such new variables used within each data flow are transient, since the data represented by the variables are consumed within the data flow and discarded after the execution of the data flow. Thus, asynchronous variable/data in the program 101 refers to the data being stored into a location/variable for use at an unspecified/unknown time when the data is needed; and there is no hardware imposed limitation on the time period between data arrival and data use; in contrast, synchronous variable/data refers to the data being generated for use at a time determined by a synchronous connection in the coarse grained reconfigurable array (CGRA) 103. The instructions in a data flow may not be connected based on the sequence of the instructions written in the flow description. Some instructions are tied to each other based on the data being consumed as input and data being generated as output that may be consumed synchronously, or propagated asynchronously.

Further details about the coarse grained reconfigurable array 103, the dispatch interface information 111, the memory interface information 113, and the tile memory information 115 are provided below in connection with FIG. 3 to FIG. 6.

Figure 2:
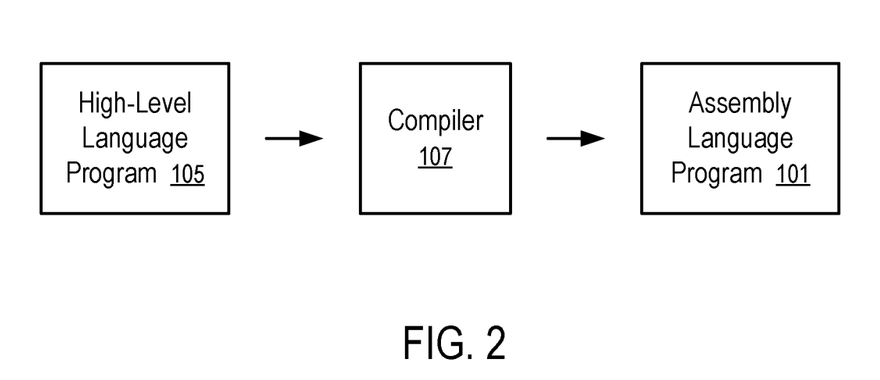
FIG. 2 illustrates the generation of an assembly language program using a compiler according to one embodiment.

FIG. 2 illustrates the generation of an assembly language program using a compiler according to one embodiment.

In FIG. 2, a user can use a high-level language to specify a program 105 of the operations to be performed by a coarse grained reconfigurable array 103. A compiler 107 can read the high-level language program 105 and convert it to the assembly language program 101 of FIG. 1.

Alternatively, the user can write the assembly language program 101 without using a compiler (e.g., 107). For example, a programming/compilation tool can be adapted to receive user inputs to specify the assembly language program 101.

Figure 3:
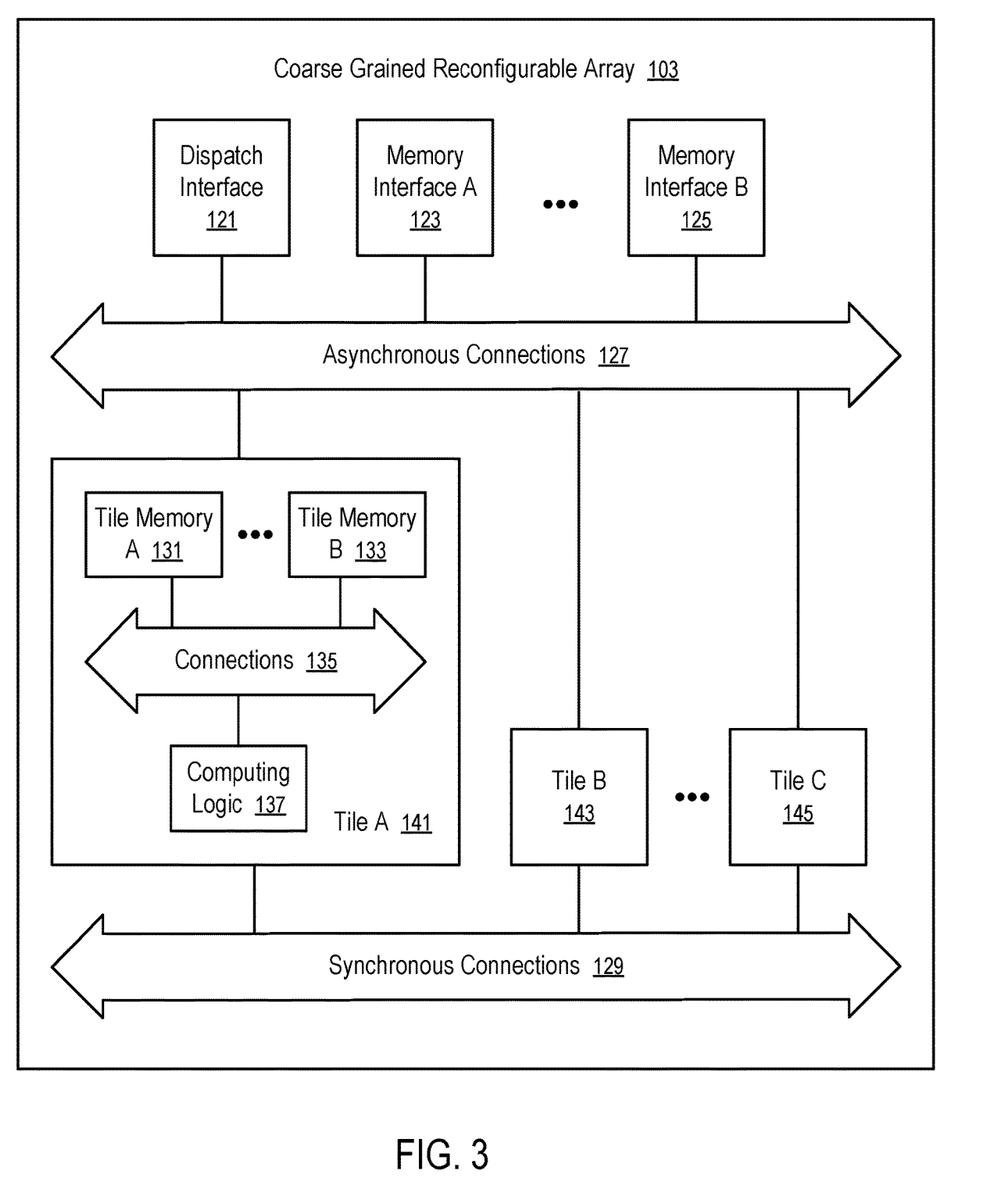
FIG. 3 illustrates a coarse grained reconfigurable array in which an assembly language program according to one embodiment can be configured to specify operations.

FIG. 3 illustrates a coarse grained reconfigurable array in which an assembly language program according to one embodiment can be configured to specify operations.

For example, the assembly language program 101 of FIG. 1 can be implemented for execution in the coarse grained reconfigurable array 103 of FIG. 3.

In FIG. 3, the coarse grained reconfigurable array 103 has a plurality of tiles 141, 143, . . . , 145 that can operate in parallel. The tiles can have the same (or similar) structure.

A typical tile 141 includes tile memories 131, . . . , 133 having synchronous connections 135 with a computing logic 137. The computing logic 137 can be configurable to execute different instructions. For example, the computing logic 137 can include a Single Instruction Multiple Data (SIMD) unit. Upon receiving a single instruction, the Single Instruction Multiple Data (SIMD) unit can operate on multiple data items in the tile memories 131, . . . , 133. For example, the computing logic 137 can include a pipelined time-multiplexed processing unit that can start execution of a new instruction at every clock cycle. Execution of an instruction can complete after a predetermined number of clock cycles. Results of executing instructions can propagate from one tile (e.g., 141) to a neighboring tile (e.g., 143) via synchronous connections 129 in a predetermined number of clock cycles. Results of executing instructions can also be accessed through memory interfaces (e.g., 123, . . . , 125, and dispatch interface 121) via asynchronous connections 127.

The coarse grained reconfigurable array 103 has synchronous connections 129 among some pairs of the tiles 141, 143, . . . , 145. For example, the synchronous connections 129 offer a direct connection between tile 141 and tile 143, but no direct connection between tile 143 and tile 145. For example, the synchronous connections 129 can connect neighboring tiles (e.g., 141, 143) to form a chain or pipeline among the tiles 141, 143, . . . , 145.

The coarse grained reconfigurable array 103 has asynchronous connections 127 between the tiles 141, 143, . . . , 145 and memory interfaces 123, . . . , 125 and a dispatch interface 121. The dispatch interface 121 can function as a memory interface. Each memory interface (e.g., 123 or dispatch interface 121) can access the tile memories of one or more tiles through the asynchronous connections 127. Each of the tiles 141, 143, . . . , 145 can have a delay register controllable to provide output of the tile for synchronization with the timing of the execution of a next instruction that uses the output. The dispatch interface 121 can communicate inputs and outputs of the coarse grained reconfigurable array 103 from or to a circuit external to the coarse grained reconfigurable array 103.

The assembly language program 101 of FIG. 1 can be written without the information/details of the specific structure of the coarse grained reconfigurable array 103, such as the number of tiles in the coarse grained reconfigurable array 103, the availability of specific synchronous connections 129 among certain pairs of the tiles 141, 143, . . . , 145, the availability of asynchronous connections 127 between a specific memory interface (e.g., 123) and a specific tile (e.g., 143), etc.

With the details of the coarse grained reconfigurable array 103, the assembly language program 101 of FIG. 1 can be mapped for execution using the tiles 141, 143, . . . , 145. The dispatch interface information 111, the memory interface information 113, and the tile memory information 115 can assist the mapping; and the flow description 117 makes it easier to identify a correct schedule of mapping each instruction to a respective tile at a correct clock cycle such that the Coarse Grained Reconfigurable Array 103 correctly performs the operations of the assembly language program 101.

The operations of the Coarse Grained Reconfigurable Array 103 can be described and/or scheduled as flows of data among tile memories (e.g., 131, . . . , 133) of tiles (e.g., 141, 143, . . . , 145) through the connections 135, 129, and 127 and the computing logic 137 at various clock cycles. Since the flow description 117 describes the required data flows for the operations of the assembly language program 101, the data flows identified by the flow description 117 can be mapped to the data flows in the Coarse Grained Reconfigurable Array 103 for execution.

Figure 4:
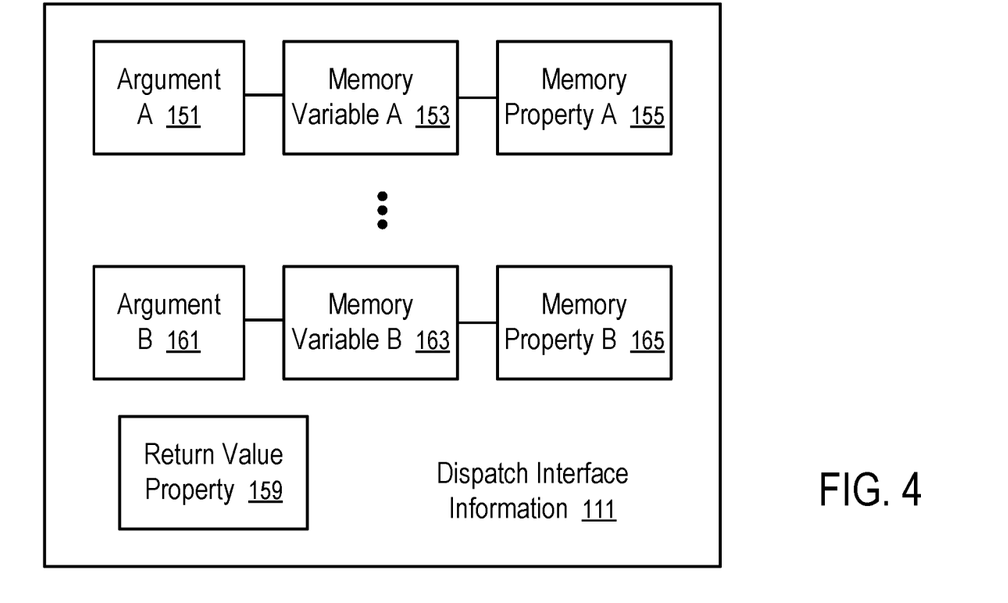
FIG. 4 illustrates dispatch interface information of an assembly language program according to one embodiment.

FIG. 4 illustrates dispatch interface information of an assembly language program according to one embodiment.

For example, the dispatch interface information 111 of FIG. 4 can be used in the assembly language program 101 of FIG. 1.

The assembly language program 101 of FIG. 1 can have a plurality of arguments 151, . . . , 161 to receive inputs to the assembly language program 101. For each of the arguments 151, . . . , 161, the dispatch interface information 111 identifies a memory variable (e.g., 153, or 163) to be mapped into a tile memory (e.g., 131 or 133) and the memory property (e.g., 155 or 165) of the corresponding memory variable (e.g., 153, or 163) (e.g., the property of the input data to be received via the respective argument). A memory property (e.g., 155 or 165) can identify a data type and/or a data size of the input to be received via the corresponding argument (e.g., 151 or 161).

The storing of the input data to the memory locations represented by the memory variables 153, . . . , 163 can be implemented via the operations of the dispatch interface 121 of the Coarse Grained Reconfigurable Array 103.

The dispatch interface information 111 can further specify the return value property 159 of the assembly language program 101. For example, the return value property 159 can specify the data type and/or a data size of the value to be returned by the assembly language program 101 upon completion of execution of the assembly language program 101.

Figure 5:
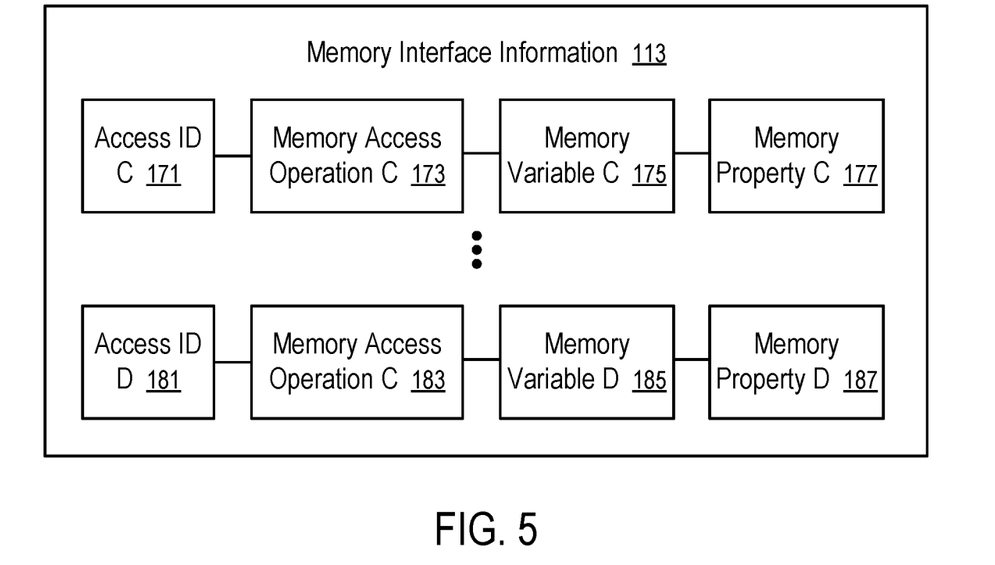
FIG. 5 illustrates memory interface information of an assembly language program according to one embodiment.

FIG. 5 illustrates memory interface information of an assembly language program according to one embodiment.

For example, the memory interface information 113 of FIG. 5 can be used in the assembly language program 101 of FIG. 1.

The memory interface information 113 identifies a plurality of memory access operations 173, . . . , 183. Each memory access operation (e.g., 173 or 183) can be an operation to store data into memory or read data from memory, where the memory location is represented by a memory variable (e.g., 175 or 185) having a corresponding memory property (e.g., 177 or 187) for the data stored or accessed at the memory location. The memory access operations (e.g., 173 or 183) can be implemented via the operations of the memory interfaces 123, . . . , 125 and/or the dispatch interface 121 of the Coarse Grained Reconfigurable Array 103. The memory access operations (e.g., 173 or 183) are associated with access IDs (e.g., 171 or 181) in the memory interface information 113 to represent the corresponding memory access operations (e.g., 173 or 183). The flow description 117 of the assembly language program 101 can use the access IDs (e.g., 171 or 181) to specify the uses of the respective memory access operations (e.g., 173 or 183) in the data flow graphs.

A memory property (e.g., 177 or 187) can identify a data type and/or a data size of the data to be operated upon via the memory access operation (e.g., 173 or 183).

Figure 6:
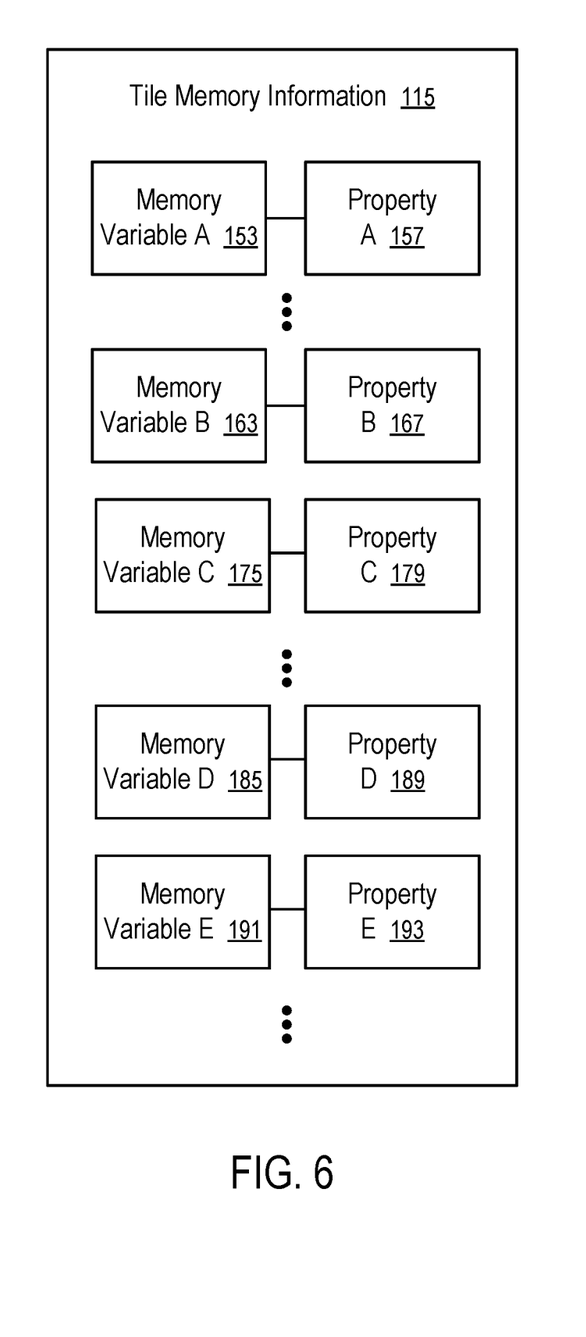
FIG. 6 illustrates tile memory information of an assembly language program according to one embodiment.

FIG. 6 illustrates tile memory information of an assembly language program according to one embodiment.

For example, the tile memory information 115 of FIG. 6 can be used in the assembly language program 101 of FIG. 1.

The tile memory information 115 identifies the properties (e.g., 157, . . . , 167, 179, . . . , 189, 193, . . . ) of the respective memory variables (e.g., 153, . . . , 163, 175, . . . , 185, 191, . . . ) used in the flow description 117 to identify memory locations in tiles of a Coarse Grained Reconfigurable Array 103. To execute the assembly language program 101, the memory variables (e.g., 153, . . . , 163, 175, . . . , 185, 191, . . . ) are mapped to tile memories (e.g., 131, . . . , 133) of tiles (e.g., 141, 143, . . . , 145) of the Coarse Grained Reconfigurable Array 103.

The properties (e.g., 157, . . . , 167, 179, . . . , 189, 193, . . . ) can identify the memory access types, sizes, etc. of the respective memory variables (e.g., 153, . . . , 163, 175, . . . , 185, 191, . . . ). Examples of memory access type can include unknown, shared, first in first out (FIFO), etc.

The memory variables specified in the tile memory information 115 can include memory variables (e.g., 153, . . . , 163) identified in the dispatch interface information 111, memory variables (e.g., 175, . . . , 185) identified in the memory interface information 113, and other memory variables used in the flow description 117 to identify memory locations of data flows. The flow description 117 further identifies operations perform to transform the data along the flows.

Figure 7:
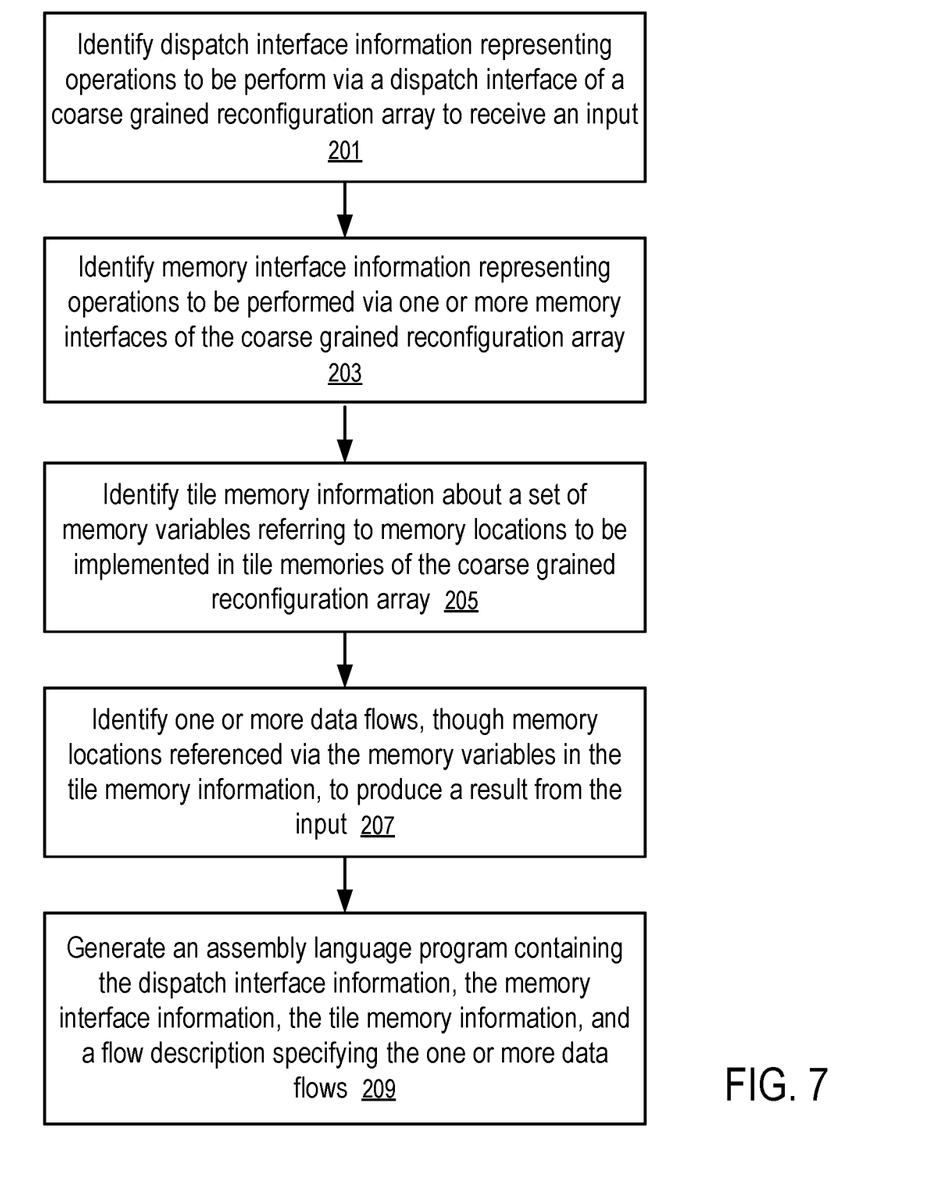
FIG. 7 shows a method of specifying operations in a coarse grained reconfigurable array according to one embodiment.

FIG. 7 shows a method of specifying operations in a coarse grained reconfigurable array according to one embodiment.

For example, the method of FIG. 7 can be performed by a user, a compiler, or a compilation/programming tool implemented via software and/or hardware in a computing device to generate the assembly language program 101 of FIG. 1.

At block 201, the user, compiler, and/or compilation/programming tool identifies dispatch interface information 111 representing operations to be performed via a dispatch interface 121 of a coarse grained reconfigurable array 103 to receive an input.

For example, the coarse grained reconfigurable array 103 can have a plurality of tiles 141, 143, . . . , 145 interconnected via synchronous connections 129 and 135 and asynchronous connections 127. Each of the tiles (e.g., 141) has tile memories (e.g., 131, . . . , 133) and a reconfigurable computing logic (e.g., 137). In response to an instruction, the computing logic 137 can be reconfigured to perform the operation of the instruction in the flow of data from one memory location to another in the coarse grained reconfigurable array 103.

For example, the dispatch interface information 111 can include identification of first memory variables 153, . . . , 163 for arguments 161, . . . , 161 respectively to indicate the operations of writing the input according to the arguments to the memory locations represented by the first memory variables 153, . . . , 163.

At block 203, the user, compiler, and/or compilation/programming tool identifies memory interface information 113 representing operations to be performed via one or more memory interfaces of the coarse grained reconfigurable array.

For example, the memory interface information 113 can include identification of second memory variables 175, . . . , 185 associated with memory access operations 173, . . . , 183 for storing or retrieving data items to or from memory locations referred to and represented by the second memory variables 175, . . . , 185.

The memory interface information 113 and the dispatch interface information 111 can include the types and sizes of data items identified by memory variables (e.g., 153, 163, 175, 185) and operated upon in the respective memory access operations (e.g., 173, 183, or storing inputs according to the arguments 151, . . . , 161).

At block 205, the user, compiler, and/or compilation/programming tool identifies tile memory information 115 about a set of memory variables (e.g., 153, . . . , 163, 175, . . . , 185, 191, . . . ) referring to memory locations to be implemented in tile memories (e.g., 131, 133) of the coarse grained reconfigurable array 103.

The tile memory information 115 can further identify access types and sizes of the set of memory variables (e.g., 153, . . . , 163, 175, . . . , 185, 191, . . . ) for implementation in the coarse grained reconfigurable array. The set of memory variables (e.g., 153, . . . , 163, 175, . . . , 185, 191, . . . ) can include the first memory variables (e.g., 153, . . . , 163) identified in the dispatch interface information 111, the second memory variables (e.g., 175, . . . , 185) identified in the memory interface information 113, and at least one third memory variable 191 referring to a memory location in one or more synchronous data flows to be implemented via the coarse grained reconfigurable array 103.

At block 207, the user, compiler, and/or compilation/programming tool identifies one or more synchronous data flows, through memory locations referenced via the memory variables (e.g., 153, . . . , 163, 175, . . . , 185, 191, . . . ) in the tile memory information 115, to produce a result from the input. Data can be transformed via execution of instructions along the flows; and the data flows can go through other variables that do not have to be mapped to tile memories.

At block 209, the user, compiler, and/or compilation/programming tool generates an assembly language program 101 containing the dispatch interface information 111, the memory interface information 113, the tile memory information 115, and a flow description 117 specifying the one or more data flows.

For example, a compiler 107 can be configured to compile a computer program 105 written in a high-level language to generate the assembly language program 101.

Alternatively, a compilation/programming tool can be configured to present a user interface to receive user inputs to identify the dispatch interface information 111, the memory interface information 113, the tile memory information 115, and the one or more data flows, etc. Based on the user inputs, the compilation/programming tool can check for errors and generate the assembly language program 101.

Optionally, a compiler and/or a compilation/programming tool can be further configured to map the one or more data flows specified in the assembly language program 101 to flows of data in the coarse grained reconfigurable array 103, including mapping the set of memory variables (e.g., 153, . . . , 163, 175, . . . , 185, 191, . . . ) to tile memories (e.g., 131, 133) in the coarse grained reconfigurable array 103.

Figure 8:
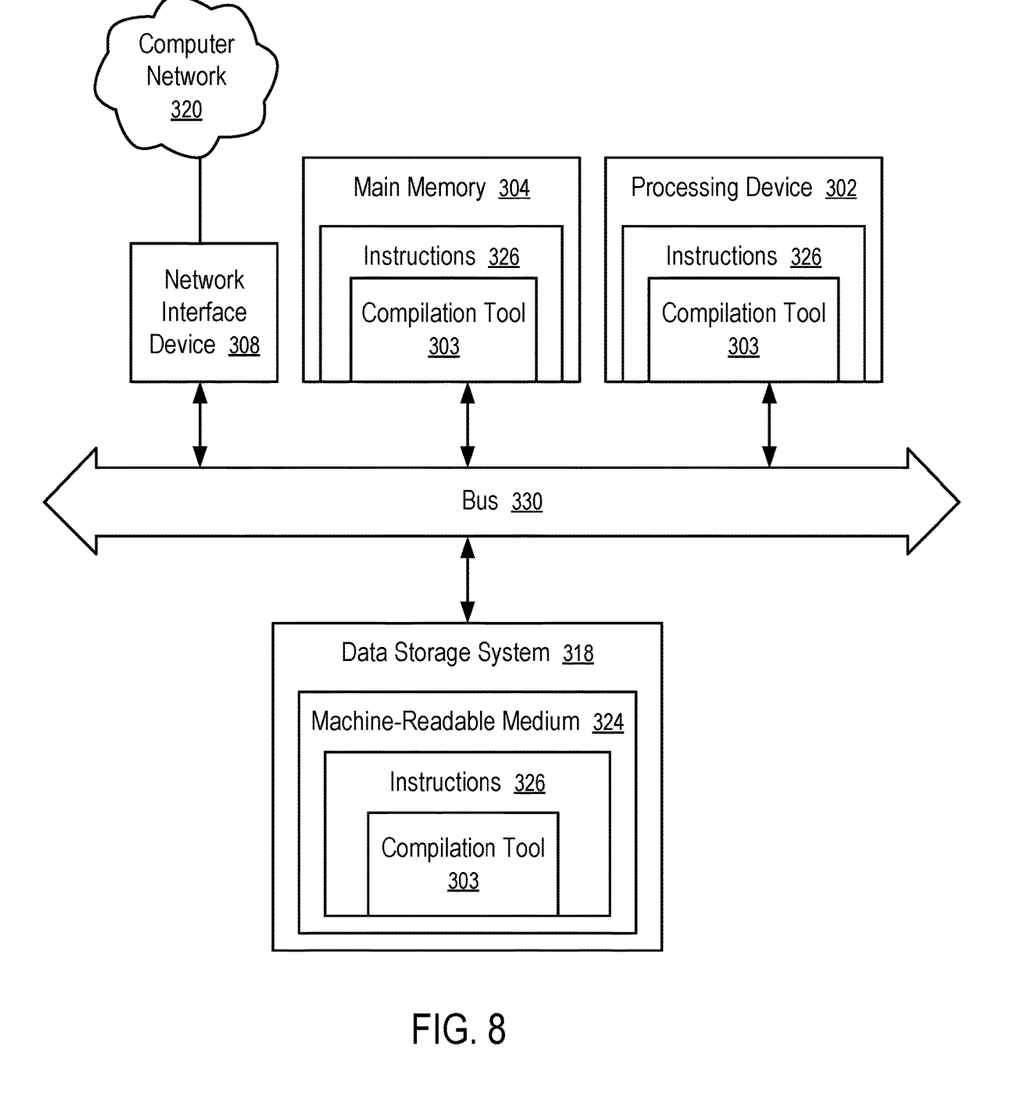
FIG. 8 shows a block diagram of an example computer system in which embodiments of the present disclosure can operate.

FIG. 8 illustrates an example machine of a computer system within which a set of instructions, for causing the machine to perform any one or more of the methodologies discussed herein, can be executed.

The computer system of FIG. 8 can be used to perform the operations of a compilation tool 303 to generate an assembly language program 101 discussed with reference to FIG. 1-FIG. 7 by executing instructions configured to perform the operations corresponding to the compilation tool 303, such as the compiler 107 or another tool to assist a user in writing the assembly language program 101.

In some embodiments, the machine can be connected (e.g., networked) to other machines in a Local Area Network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 8 includes a processing device 302, a main memory 304, and a data storage system 318, which communicate with each other via a bus 330. For example, the processing device 302 can include one or more microprocessors; the main memory can include read-only memory (ROM), flash memory, dynamic random access memory (DRAM), such as synchronous DRAM (SDRAM) or Rambus DRAM (RDRAM), static random access memory (SRAM), etc. The bus 330 can include, or be replaced with, multiple buses.

The processing device 302 in FIG. 8 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 302 can also be one or more special-purpose processing devices such as an application specific integrated circuit (ASIC), a field programmable gate array (FPGA), a digital signal processor (DSP), a network processor, or the like.

The computer system of FIG. 8 can further include a network interface device 308 to communicate over a computer network 320.

The data storage system 318 can include a machine-readable medium 324 (also known as a computer-readable medium) on which is stored one or more sets of instructions 326 or software embodying any one or more of the methodologies or functions described herein. The instructions 326 can also reside, completely or at least partially, within the main memory 304 and/or within the processing device 302 during execution thereof by the computer system, the main memory 304 and the processing device 302 also constituting machine-readable storage media.

In one embodiment, the instructions 326 include instructions to implement functionality corresponding to a compilation tool 303, such as the compiler 107 or an authoring tool for an assembly language program 101 described with reference to FIG. 1 to FIG. 7. While the machine-readable medium 324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-2394 bus adapter for controlling IEEE-2394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
identifying dispatch interface information representing operations to be performed via a dispatch interface of a coarse grained reconfigurable array to receive an input;
identifying memory interface information representing operations to be performed via one or more memory interfaces of the coarse grained reconfigurable array;
identifying tile memory information about a set of memory variables referring to memory locations to be implemented in tile memories of the coarse grained reconfigurable array;
identifying one or more synchronous data flows, through memory locations referenced via the memory variables in the tile memory information, to produce a result from the input; and
generating an assembly language program containing the dispatch interface information, the memory interface information, the tile memory information, and a flow description specifying the one or more data flows.

2. The method of claim 1, wherein the coarse grained reconfigurable array includes a plurality of tiles interconnected via synchronous connections and asynchronous connections, each of the tiles having tile memories and a reconfigurable computing logic.

3. The method of claim 2, wherein the memory interface information and the dispatch interface information identify memory operations implemented via the asynchronous connections, and types of data to be operated upon by the memory operations.

4. The method of claim 3, wherein the dispatch interface information identifies operations of storing inputs, received via arguments of the assembly language program, into memory locations referred to via first memory variables.

5. The method of claim 4, wherein the memory interface information identifies operations of storing data to, or retrieving data from, memory locations referred to via second memory variables.

6. The method of claim 5, wherein the tile memory information further identifies access types of the set of memory variables when implemented in the coarse grained reconfigurable array.

7. The method of claim 5, wherein the set of memory variables includes the first memory variables, the second memory variables, and at least one third memory variable referring to a memory location in the one or more synchronous data flows; and the one or more synchronous data flows use fourth variables not mapped for implementation in tile memories.

8. The method of claim 7, further comprising:
mapping the one or more synchronous data flows to flows of data in the coarse grained reconfigurable array, including mapping the set of memory variables to tile memories in the coarse grained reconfigurable array.

9. The method of claim 7, further comprising:
compiling a computer program to generate the assembly language program.

10. The method of claim 7, further comprising:
receiving user inputs to identify the dispatch interface information, the memory interface information, the tile memory information, and the one or more synchronous data flows;
wherein the assembly language program is generated based on the user inputs.

11. A computing device, comprising:
a memory; and
a microprocessor coupled with the memory and configured via instructions to:
identify dispatch interface information representing operations to be performed via a dispatch interface of a coarse grained reconfigurable array to receive an input;
identify memory interface information representing operations to be performed via one or more memory interfaces of the coarse grained reconfigurable array;
identify tile memory information about a set of memory variables referring to memory locations to be implemented in tile memories of the coarse grained reconfigurable array;
identify one or more synchronous data flows, through memory locations referenced via the memory variables in the tile memory information, to produce a result from the input; and
generate an assembly language program containing the dispatch interface information, the memory interface information, the tile memory information, and a flow description specifying the one or more synchronous data flows.

12. The computing device of claim 11, wherein the coarse grained reconfigurable array includes a plurality of tiles interconnected via synchronous connections and asynchronous connections, each of the tiles having tile memories and a reconfigurable computing logic.

13. The computing device of claim 12, wherein the tile memory information identifies access types of the set of memory variables.

14. The computing device of claim 13, wherein the dispatch interface information identifies operations of storing inputs, received via arguments of the assembly language program, into memory locations referred to via first memory variables; and the memory interface information identifies operations of storing data to, or retrieving data from, memory locations referred to via second memory variables.

15. The computing device of claim 14, wherein the memory interface information and the dispatch interface information identify memory operations implemented via the asynchronous connections, and types of data to be operated upon by the memory operations.

16. The computing device of claim 14, wherein the microprocessor is further configured via the instructions to:
map the one or more synchronous data flows to flows of data in the coarse grained reconfigurable array, including mapping the set of memory variables to tile memories in the coarse grained reconfigurable array, wherein the one or more synchronous data flows go through at least fourth variables not mapped to tile memories.

17. The computing device of claim 14, the microprocessor is further configured via the instructions to:
compile a computer program to generate the assembly language program.

18. A non-transitory computer storage medium storing instructions which, when executed by a computing device, cause the computing device to perform a method, comprising:
identifying dispatch interface information representing operations to be performed via a dispatch interface of a coarse grained reconfigurable array to receive an input;
identifying memory interface information representing operations to be performed via one or more memory interfaces of the coarse grained reconfigurable array;
identifying tile memory information about a set of memory variables referring to memory locations to be implemented in tile memories of the coarse grained reconfigurable array;
identifying one or more synchronous data flows, through memory locations referenced via the memory variables in the tile memory information, to produce a result from the input; and
generating an assembly language program containing the dispatch interface information, the memory interface information, the tile memory information, and a flow description specifying the one or more synchronous data flows.

19. The non-transitory computer storage medium of claim 18, wherein the dispatch interface information is configured to identify:
operations of storing inputs, received via arguments of the assembly language program, into memory locations referred to via first memory variables in the set of memory variables; and data types of the inputs;

wherein the memory interface information is configured to identify:
- operations of storing or retrieving data items to or from memory locations referred to via second memory variables in the set of memory variables; and
- data types of the data items; and wherein the tile memory information is configured to identify access types of the set of memory variables.

20. The non-transitory computer storage medium of claim 18, wherein the coarse grained reconfigurable array includes a plurality of tiles interconnected via synchronous connections and asynchronous connections, each of the tiles having tile memories and a reconfigurable computing logic.

* * * * *